United States Patent [19]

Sugiura

[11] Patent Number: 5,168,369

[45] Date of Patent: Dec. 1, 1992

[54] IMAGE READER HAVING ELECTRICAL AND OPTICAL MEANS FOR VARYING MAGNIFICATION

[75] Inventor: Masamichi Sugiura, Toyokawa, Japan

[73] Assignee: Minolta Camera Kabushiki Kaisha, Osaka, Japan

[21] Appl. No.: 743,431

[22] Filed: Aug. 9, 1991

Related U.S. Application Data

[60] Division of Ser. No. 607,858, Oct. 30, 1990, Pat. No. 5,097,519, which is a continuation of Ser. No. 173,986, Mar. 28, 1988, abandoned, which is a continuation of Ser. No. 865,894, May 21, 1986, Pat. No. 4,771,473.

[30] Foreign Application Priority Data

May 22, 1985 [JP] Japan ................ 60-110827

[51] Int. Cl.⁵ .............. H04N 1/387; H04N 1/393; G06K 9/42; G03B 27/52
[52] U.S. Cl. .................. 358/296; 358/451; 355/55; 382/47
[58] Field of Search .......... 355/55; 358/296, 451; 382/47

[56] References Cited

U.S. PATENT DOCUMENTS

| | | | |
|---|---|---|---|
| 3,921,136 | 11/1975 | Bar-Lev | 382/47 |
| 4,074,324 | 2/1978 | Barrett . | |
| 4,290,084 | 9/1981 | Minshull et al. . | |
| 4,302,782 | 11/1981 | Gunning et al. . | |
| 4,366,508 | 12/1982 | Crean et al. . | |
| 4,496,983 | 1/1985 | Takenaka . | |
| 4,505,579 | 3/1985 | Furuichi . | |
| 4,543,643 | 9/1985 | Shibazaki et al. . | |
| 4,587,621 | 5/1986 | DuVall | 355/55 |
| 4,673,972 | 6/1987 | Yokomizo . | |
| 4,687,944 | 8/1987 | Mitsuka et al. . | |
| 4,701,808 | 10/1987 | Nagashima . | |
| 4,771,473 | 9/1988 | Sugiura | 382/47 |
| 5,083,216 | 1/1992 | Abuyama | 358/451 |

FOREIGN PATENT DOCUMENTS 102386 9/1982 Japan .
182366 7/1983 Japan .

Primary Examiner—Benjamin R. Fuller
Assistant Examiner—Eric Frahm
Attorney, Agent, or Firm—Price, Gess & Ubell

[57] ABSTRACT

An optical image reader having the capacity to vary magnification both electrically and optically is provided. Operator controls permit variable magnification of image signals to a desired level. An optical sensor can be independently moved for focusing.

4 Claims, 6 Drawing Sheets

IMAGE READER HAVING ELECTRICAL AND OPTICAL MEANS FOR VARYING MAGNIFICATION

This is a division of application Ser. No. 607,858, filed on Oct. 30, 1990now U.S. Pat. No. 5,097,519, which is a continuation of U.S. Ser. No. 173,986, filed on Mar. 28, 1988, now abandoned, which is a continuation of U.S. Ser. No. 865,894, filed on May 21, 1986, and issued as U.S. Pat. No. 4,771,473 on Sep. 13, 1988.

BACKGROUND OF THE INVENTION

1. Field of the Invention

The present invention relates to an apparatus which can read a document at a desirable magnification.

2. Description of the Prior Art

In an image reader, the density of a document is read with an image sensor and is sent to an external output apparatus such as a printer after being transformed into bi-level data.

In a conventional image reader, the magnification for reading is varied by processing signals electrically.

In the electrical variation of magnification, image signals from the image sensor are processed electrically so as to enlarge or reduce the image, while the resolution of reading by the image sensor is kept unchanged.

An essential disadvantage in the electrical variation is that an output image is made coarse upon enlarging the image at high magnification because it is enlarged without heightening the resolution of reading.

SUMMARY OF THE INVENTION

An object of the present invention is to provide an image reader which can read an image and maintain resolution even at a higher magnification.

Another object of the present invention is to provide an image reader in which the magnification of reading can be varied over a wide range.

A further object of the present invention is to provide an image reader in which an image can be enlarged or reduced optically.

A still further object of the present invention is to provide an image reader in which an image can be enlarged or reduced according to the resolution of a printer connected to the image reader.

According to the present invention there is provided an image reader for reading an image of a document, comprising: (1) an optical projection means for projecting an image of a document; (2) an image reading means for transforming the projected image into electrical image signals; (3) a first variable magnification means for varying optically the size of the image to be projected on the image reading means; (4) a second variable magnification means for varying electrically the size of the image projected on the image reading means by transforming the electrical image signals received from the image reading means into other electrical image signals which correspond to a size of image different from the original size; and (5) a variable magnification control means for controlling the first and second variable magnification means so as to give image signals having a magnification designated.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENTS

Figure 1:
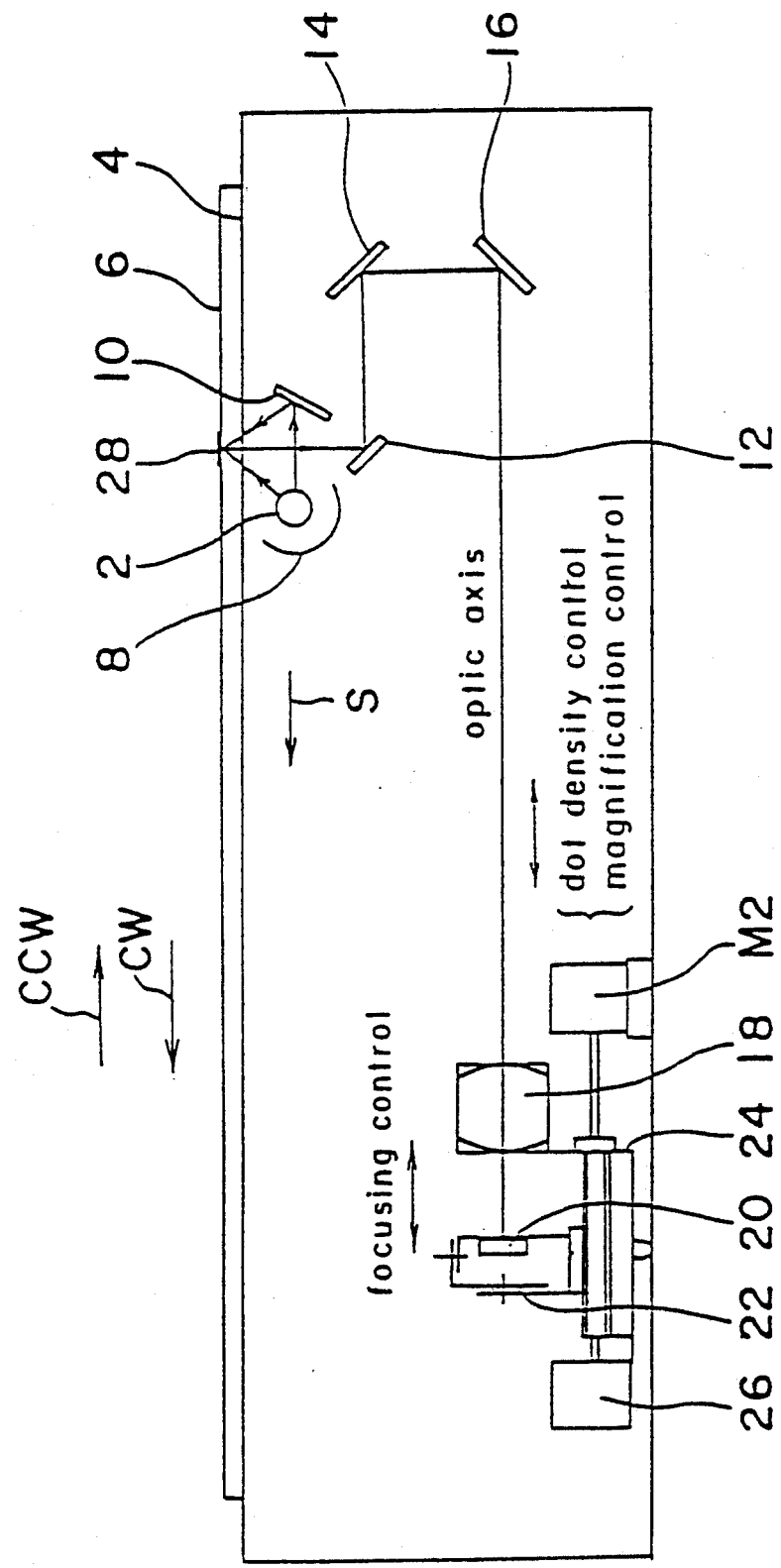
FIG. 1 is a sectional view of an image reader.

In the embodiment of the present invention, the optical variation of magnification will be adopted as far as a magnification to be set is in an allowable range wherein the magnification can be set optically. If the magnification to be set is smaller than the allowable range, the optical variation at a magnification of two times the magnification to be set is combined with the optical variation at a magnification of one-half of the magnification to be set. In general, the optical variation at a magnification of n (which is preferably a positive integer) times the magnification to be in the allowable range can be combined with the electrical variation at a magnification of an n-th times the magnification to be set. Further, the optical variation is combined with an electrical variation at a fixed magnification (for example, 1/1, ½, etc.) as needed.

Further, the dot density of a printer can be set in the embodiment of the present invention. Therefore, the output signal of the reading can be sent to any printers having a variety of dot densities.

Referring now to the drawings, wherein like reference characters designate corresponding parts through several views, an image reader of an embodiment according to the present invention will be explained in the following order:

(a) Image reader;
(b) Control of image reader;
(c) Main flow of reading at a variable magnification;
(d) Movement of lens; and
(e) Scan.

(a) Image reader:

FIG. 1 shows a schematical sectional view of an image reader according to the present invention. A light source for exposure illuminates a document 6 placed on a glass platen 4. The light source of exposure consists of a halogen lamp 2, a concave mirror 8 and a flat mirror 10.

The light reflected from the document 6 is reflected successively in a scan system or a slider which comprises a first mirror 12, a second mirror 14 and a third mirror 16. Then, it is transmitted on a one-dimensional charge-coupled device (image sensor) 20 through an optical lens assembly 18. The lens assembly is a zoom lens assembly which can vary the magnification of reading continuously.

The charge-coupled device (hereinafter referred to as "CCD") 20 is fixed to a CCD holder 22, which controls the position and the angle of the CCD 20. The CCD holder 22 and the lens 18 are fixed on a carriage 24.

The reading size of an image of the document 6 can be varied continuously by moving the carriage 24 along the direction of the optic axis of the lens 18 by using a motor M2 for the control of magnification.

The focusing can be controlled by moving CCD 20 along the direction of the optic axis by using a motor 26 fixed to the carriage 24.

As is well known, on scanning the document 6, the light source 2, 8, 10 and the first mirror 12 are moved as one body in a direction of an arrow S at a velocity V, while the second and third mirrors 14, 16 are moved as one body in the direction of the arrow S at the velocity of $(\frac{1}{2})$V, by using a scan motor M1 (not shown).

Figure 2:
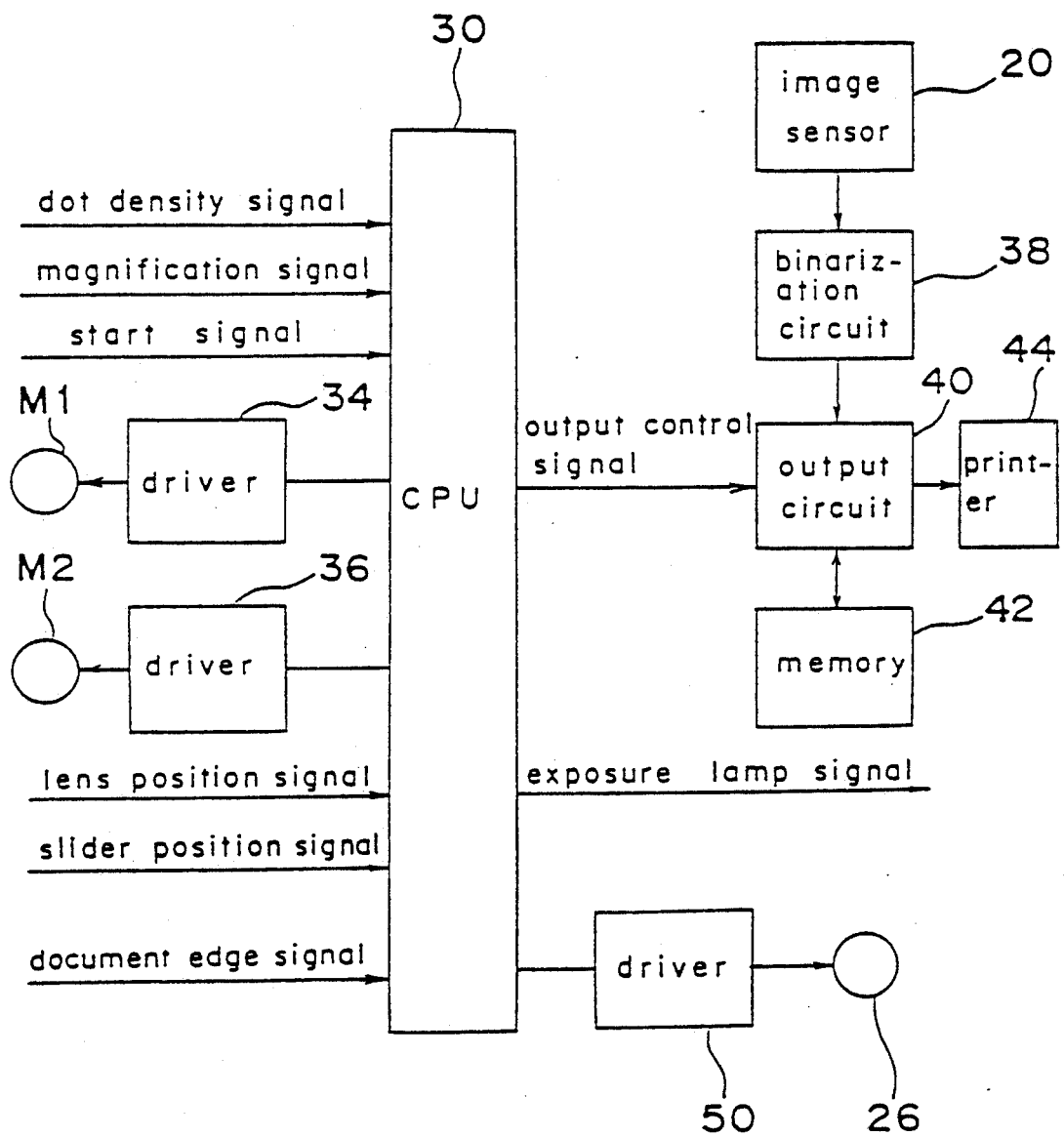
FIG. 2 is a block diagram of an electric circuit of an image reader.

(b) Control of image reader:

FIG. 2 shows a block diagram of an electric circuit for the control of the image reader.

Various kinds of input and output signals are connected to a microprocessor (hereinafter referred to as "CPU") 30. The following input signals are sent into CPU 30. A dot density signal is a signal which designates the resolution of a printer which is connected to the image reader, and the signal corresponds, for example, to a dot density of 240, 330 or 400 dots/inch. A magnification signal is a signal which designates the magnification of reading of an image on the document 6. A start signal is a signal which initiates the action of the reading. The above-mentioned input signals are sent from an operation panel (not shown). A lens position signal is generated when the lens 18 is located at an initial position where the magnification is one. A slider position signal is generated when the slider is located at a predetermined standard position. A document edge signal is generated when the slider is located at a position which corresponds to the leading edge of the document.

The scan motor M1, the lens motor M2 and the focusing motor 26 are all pulse motors, and they are driven by pulse-motor drivers 34, 36 and 38, respectively.

An exposure lamp signal is used for turning on the lamp 2.

An output signal of the image sensor 20 is transformed from an analog signal to a digital one-bit signal by a binarization circuit 50, and the digital signal is sent via an output circuit 40 to an external apparatus (printer) 14. The output circuit 40 sends or stops sending an output signal according to an output control signal received from CPU 30.

When the magnification of $\frac{1}{2}$ is designated in the electrical variation of magnification a $\frac{1}{2}$ signal of the output control signal is generated, and binary signals from the binarization circuit 40 are thinned out. In other words, an odd-bit line of the binary signals is sent to a memory 42 during a subscan in the longitudinal direction, while an even-bit line of the binary signals is sent via the output circuit 40 to a printer 44 during a main scan in the transverse direction.

Figure 3:
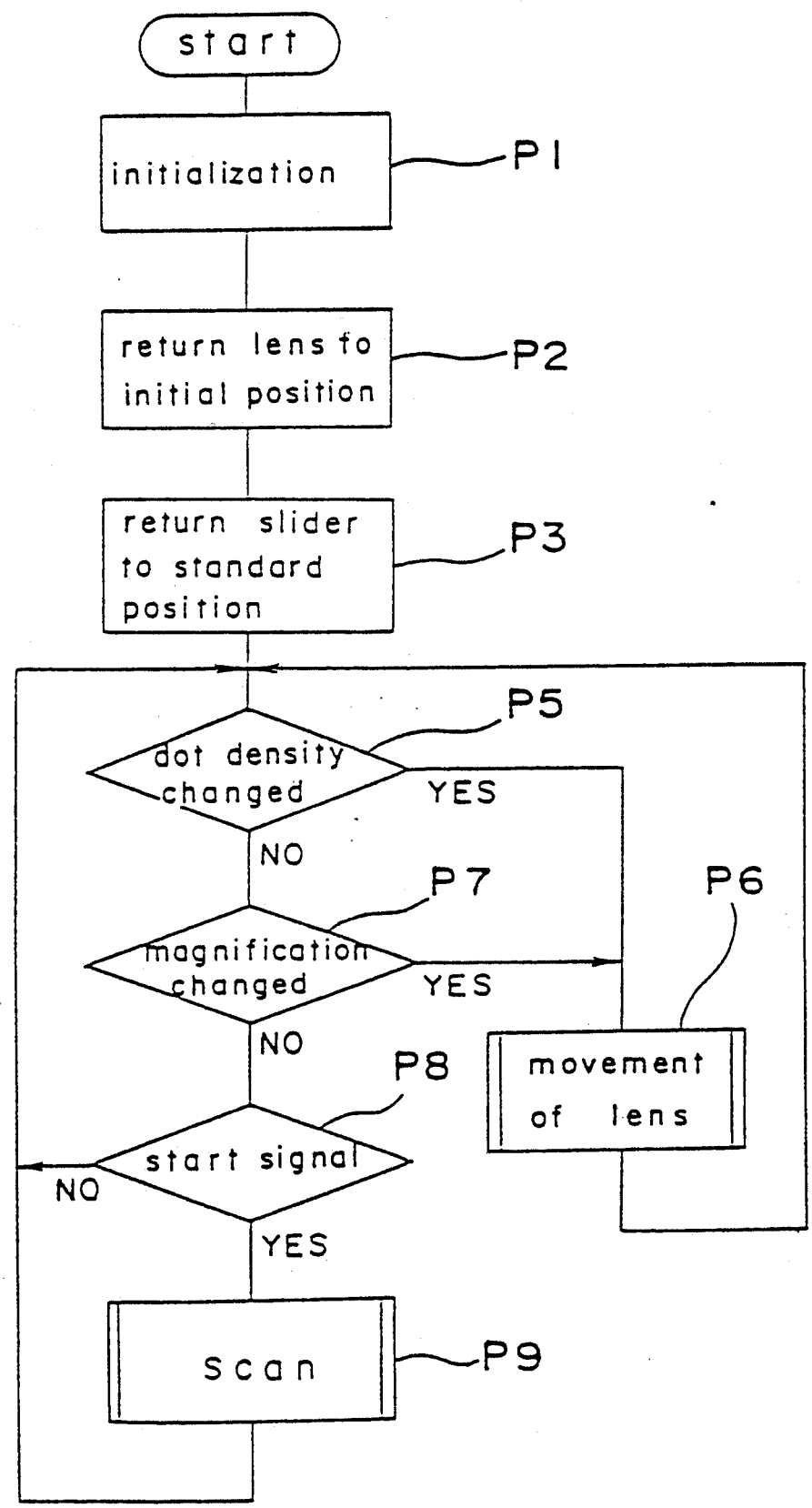
FIG. 3 is a flowchart of the main flow of the variation of magnification.

(c) Main flow of the reading at a variable magnification:

FIG. 3 shows a main flow of the reading at a variable magnification. When the source of electric power is turned on, the image reader is initialized first (step P1). Next, the lens 18 is returned by the lens motor M2 to the initial position at which the magnification is set to one (step P2), and the slider is returned by the scan motor M1 to the standard position (step P3).

Then, it is decided whether the dot density is changed from the initialized value or not (step P5). The dot density should be adapted according to the specifications of a printer connected to the image reader. If the dot density is changed, the lens 18 is moved by a lens motor M2 to a new position (step P6), and the process returns to step P5.

Next, it is decided whether the magnification is changed from the initialized value, that is, one or not (step P7). If the magnification is changed, the lens 18 and CCD 30 are moved to a new position (step P6), and the process returns to step P5. The movement of the lens 18 will be explained in detail in section (d); both changes in dot density and in magnification are processed optically in a range wherein the optical variation is allowed, otherwise the optical variation is combined with the electrical variation.

Then, it is decided whether the start signal is received or not (step P8). If the decision is no, the process returns to step P5. When the start signal is received, a scan for reading the document starts (step P9). The scan will be explained in detail in section (e). When the scan is finished, the process returns to step P5.

Figure 4A:
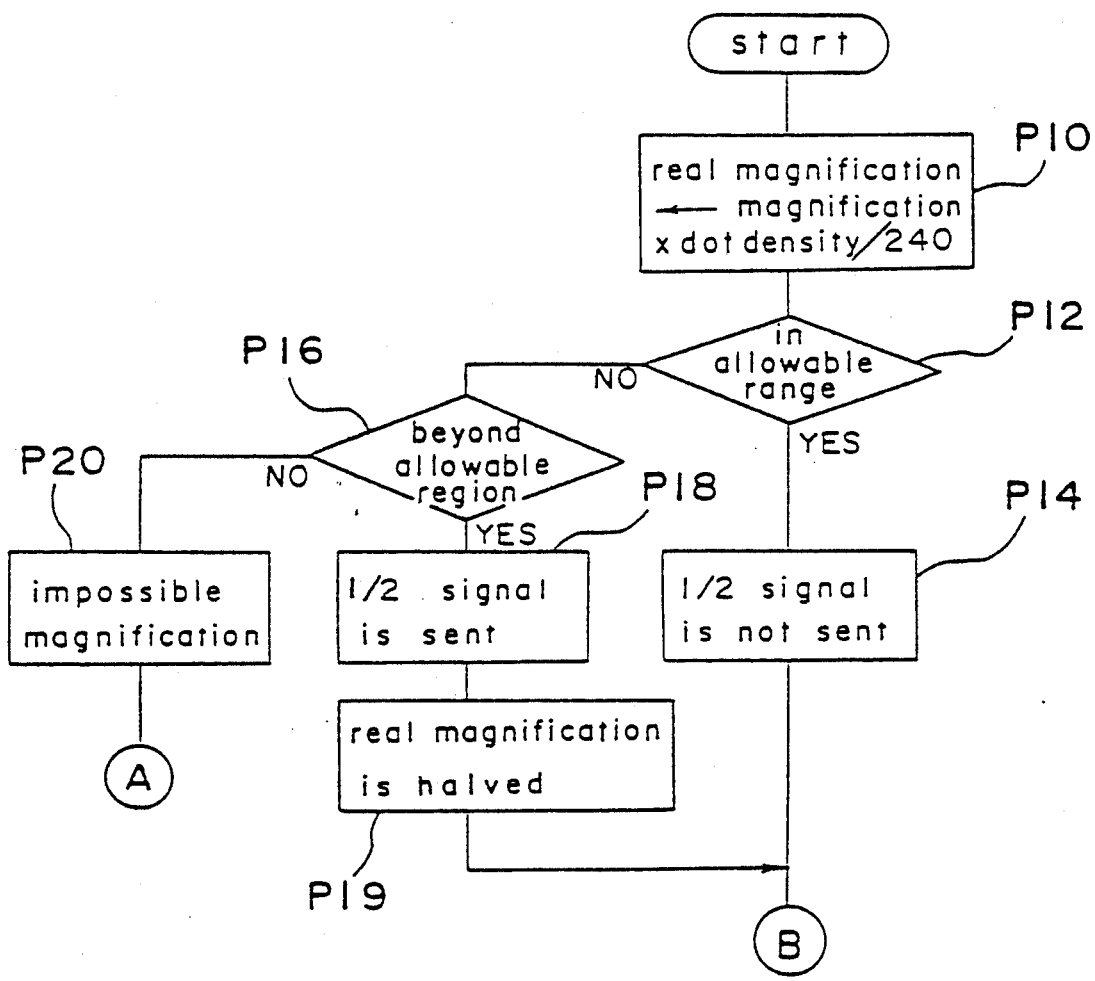
FIG. 4(a), (b) are flowcharts of the movement of a lens.
Figure 4B:
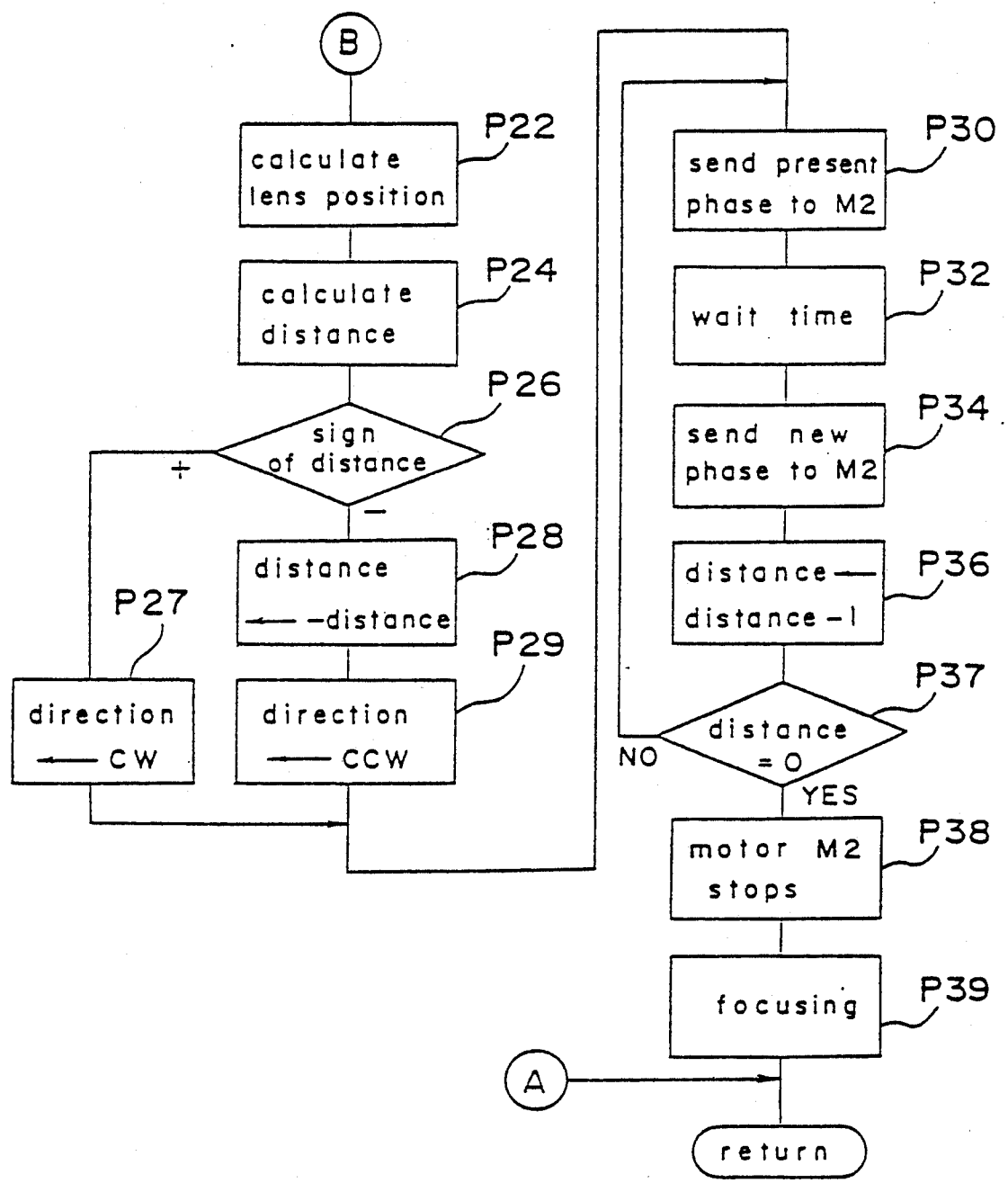

(d) Movement of lens:

The movement of lens 18 (step P6) will be explained in detail by using a flowchart shown in FIG. 4.

First, the real magnification of the image reader defined as the magnification times dot density/240 is calculated from the designated magnification and the dot density of the printer (step P10). In this embodiment, the standard dot density is 240 dots/inch. Therefore, the magnifications of one at 240 and 480 dots/inch correspond to a real magnification of one and two, respectively.

Next, it is decided whether the real magnification is in an allowable range where the optical variation is allowed or not (step P12). If the decision is yes, the $\frac{1}{2}$ signal (output control signal) is not sent to the output circuit 40 (step P14). If the real magnification is beyond the allowable range, it is decided next whether the real magnification is larger than one-half of the highest value of the allowable range (step P16). If the decision is yes, CPU 30 sends the $\frac{1}{2}$ signal to the output circuit 40 (step P18), and the real magnification is set to a half value of the real magnification calculated (step P19). On the other hand, if reduction to the designated magnification is impossible, an instruction indicating that the magnification is to be changed is displayed on the operational panel (step P20), and the process returns to the main flow.

Then, the lens position which corresponds to the real magnification is calculated (step P22), and the distance of the movement of the lens 18 is set as the difference between the present lens position and the new lens position calculated in step P22 (step P24). Next, it is decided whether the distance of the movement is positive or negative (step P26). If the distance is positive, the direction of the movement of the lens 18 is set as an arrow CW shown in FIG. 1 (step P27). If the distance is negative, the sign of the distance of the movement is set as positive (step P28), and the direction of the movement is set as an arrow CCW, shown in FIG. 1, which is the reverse direction of CW (step P29).

The lens motor M2 is a stepping motor, and the movement of the lens 18 can be expressed in a unit of one step. For the driving of the lens motor M2, the present phase is sent to the lens motor M2 (step P30). Next, the lens 18 is moved. After a prescribed time has passed (step P32), a new phase is sent to the lens motor (step P34). Then, the distance of movement is decreased by one (step P36), and it is decided whether the distance becomes zero or not (step P37). If the decision is no, the process returns to step P30, and the lens 18 will be moved further. If the movement of the calculated distance is finished, the lens motor M2 is stopped (step P38). Next, the focusing is controlled by means of the focusing motor 26 so that the difference between the detected density of the black and white pattern of a standard pattern 28 placed on the glass platen 6 becomes a maximum (step P39).

Figure 5:
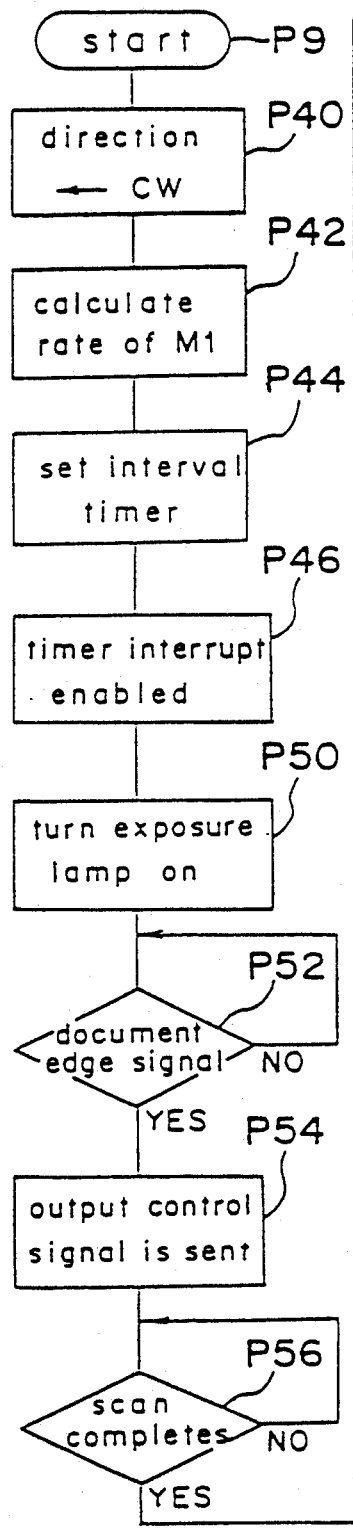
FIG. 5 is a flowchart of scan.

(e) Scan:

The scan of the reading (step P5) will be explained by using a flowchart shown in FIG. 5.

First, the direction of the movement of the scan motor M1 is set as CW, that is, scan direction (step P40). Next, the rate V of the scan Motor M1 is calculated for the real magnification (step P42), and the calculated value is set in an interval timer so that timer interrupts are requested per required time interval (step P44). Then, the interrupt is enabled (step P46). The timer interrupt will be explained later by using FIG. 6.

Next, a scan starts. First, the exposure lamp 2 is turned on, and the exposure of a document starts (step P50). Then, the slider is moved by the scan motor M1 until it reaches the lading edge of the document (step P52). When the document edge signal is received (step P52), an output control signal is sent to the output circuit 40, and the output signal of the image sensor 20 begins to be sent to the printer (step P54). Next, it is decided whether a scan of the prescribed distance is completed or not (step P56). The prescribed distance has been set from the dot density and the magnification. When the scan is completed, the output control signal is stopped, so that the output signal of the image sensor 20 to be sent to the printer is also stopped (step P58), and the exposure lamp 2 is turned off (step P59).

Then, the slider is returned as follows. The direction of movement of the slider is set as CCW, that is, the return direction (step P60), the rate of M1 for the return is set (step P62), the interval timer is set (step P64), and the movement of the slider is started by the scan motor M1. The program waits until the slider returns to the standard position (step P66). After the slider returns to the standard position and the slider position signal is received by CPU 30, a timer interrupt is forbidden (step P68), the scan motor M1 is stopped (step P69), and the process returns to the main flow.

Figure 6:
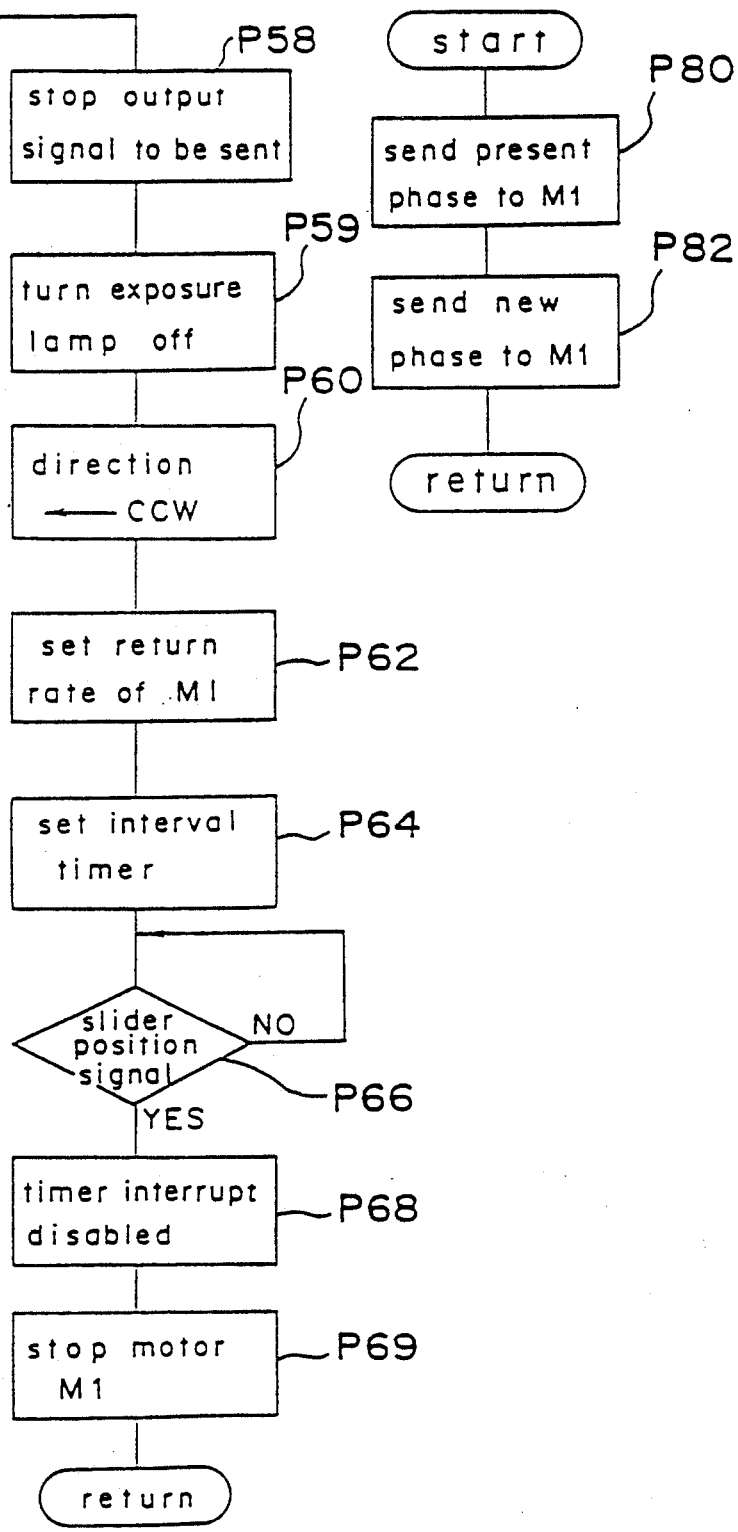
FIG. 6 is a flowchart of the interrupt routine of the timer.

The timer interrupt on the drive of the scan motor M1 is explained by using a flowchart shown in FIG. 6 as follows. When an interrupt by an interval timer is requested between step P50 and step P68, the present phase of the scan motor M1 is sent to the scan motor M1 (step P80). Then, the next phase for the next interrupt is set in the interrupt timer (step P82), where the next phase is determined according to the direction of movement. Then, the process returns to the scan routine.

In the above-mentioned embodiment, the electrical variation of magnification is combined with the optical variation of magnification with the lens 18 if the required reduction of magnification is lower than the minimum value in the allowable range of the optical variation.

Similar to the above, it is also possible, according to the present invention, to combine the optical variation with the electrical variation if such a high magnification larger than the maximum value in the allowable range of the optical variation is designated.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claim is:

1. An apparatus for converting an optical image into electrical image signals with a magnification which is variable, comprising;
    an image sensor for transforming an optical image projected thereon into analog image signals;
    a projection lens for projecting an optical image onto the image sensor;
    optical magnification varying means for optically varying a size of the optical image to be projected on the image sensor through the projection lens;
    converting means for converting the analog image signals received from the image sensor into digital image signals;
    electrical magnification varying means for transforming the digital image signals received from the converting means into other digital image signals so as to vary the magnification; and
    generating means for giving a magnification varying instruction,
    wherein the magnification inside a predetermined range is varied by operating the optical magnification varying means in response to the magnification varying instruction while the magnification outside the predetermined range is varied by operating the electrical magnification varying means in response to the magnification varying instruction.

2. An apparatus as claimed in claim 1, wherein said electrical magnification varying means includes a memory storing the digital image signals received from the converting means.

3. An apparatus as claimed in claim 1, further comprising focusing means for adjusting a focusing condition of the optical image projected on the image sensor through the projection lens.

4. An apparatus for converting an optical image into electrical image signals with a magnification which is variable, comprising:
    an image sensor composed of a charge-coupled device for transforming an optical image projected thereon into analog image signals;
    a projection lens for projecting an optical image onto the image sensor;
    optical magnification varying means for optically and continuously varying a size of the optical image to be projected on the image sensor through the projection lens;
    focusing means for adjusting a focusing condition of the optical image projected on the image sensor through the projection lens;
    converting means for converting the analog image signals received from the image sensor into digital image signals;
    electrical magnification varying means for storing the digital image signals received from the converting means into a memory and generating other digital image signals according to the digital image signals stored in the memory so as to vary the magnification; and
    generating means for giving a magnification varying instruction,
    wherein the magnification inside a predetermined range is varied by operating the optical magnification varying means in response to the magnification varying instruction while the magnification outside the predetermined range is varied by operating the electrical magnification varying means in response to the magnification varying instruction.

* * * * *

REEXAMINATION CERTIFICATE (3284th)

United States Patent [19]
Sugiura

[11] B1 5,168,369
[45] Certificate Issued    *Jul. 29, 1997

[54] IMAGE READER HAVING ELECTRICAL AND OPTICAL MEANS FOR VARYING MAGNIFICATION

[75] Inventor: Masamichi Sugiura, Toyokawa, Japan

[73] Assignee: Minolta Camera Kabushiki Kaisha, Osaka, Japan

Reexamination Request:
No. 90/004,076, Dec. 29, 1995

Reexamination Certificate for:
Patent No.: 5,168,369
Issued: Dec. 1, 1992
Appl. No.: 743,431
Filed: Aug. 9, 1991

[*] Notice: The term of this patent shall not extend beyond the expiration date of Pat. No. 4,771,473.

Related U.S. Application Data

[62] Division of Ser. No. 607,858, Oct. 30, 1990, Pat. No. 5,097,519, which is a continuation of Ser. No. 173,986, Mar. 28, 1988, abandoned, which is a continuation of Ser. No. 865,894, May 21, 1986, Pat. No. 4,771,473.

[30] Foreign Application Priority Data

May 22, 1985  [JP]  Japan ................................ 60-110827

[51] Int. Cl.$^6$ .................... H04N 1/387; H04N 1/393; G06K 9/42; G03G 15/04; G03B 27/52
[52] U.S. Cl. .................... 358/296; 358/451; 382/298; 399/196; 355/55
[58] Field of Search .................... 358/296, 451; 382/298; 399/196; 355/55

[56] References Cited

U.S. PATENT DOCUMENTS

| | | | |
|---|---|---|---|
| 3,921,136 | 11/1975 | Bar-Lev | 382/298 |
| 4,074,324 | 2/1978 | Barrett . | |
| 4,290,084 | 9/1981 | Minshull et al. . | |
| 4,302,782 | 11/1981 | Gunning et al. . | |
| 4,366,508 | 12/1982 | Crean et al. . | |
| 4,496,983 | 1/1985 | Takenaka . | |
| 4,505,579 | 3/1985 | Furuichi . | |
| 4,543,643 | 9/1985 | Shibazaki et al. . | |
| 4,587,621 | 5/1986 | DuVall | 355/55 |
| 4,629,308 | 12/1986 | Landa et al. | 355/243 |
| 4,673,972 | 6/1987 | Yokomizo . | |
| 4,687,944 | 8/1987 | Mitsuka et al. . | |
| 4,701,808 | 10/1987 | Nagashima . | |
| 4,771,473 | 9/1988 | Sugiura | 382/298 |
| 4,870,294 | 9/1989 | Hasegawa | 358/451 X |
| 4,905,096 | 2/1990 | Moriya | 358/451 |
| 5,083,216 | 1/1992 | Abuyama | 358/451 |
| 5,299,029 | 3/1994 | Moriya et al. | 358/451 X |

FOREIGN PATENT DOCUMENTS

| | | | |
|---|---|---|---|
| 56-87978 | 7/1981 | Japan | H04N 1/04 |
| 102386 | 9/1982 | Japan . | |
| 182366 | 7/1983 | Japan . | |

*Primary Examiner*—Eric Frahm

[57] ABSTRACT

An optical image reader having the capacity to vary magnification both electrically and optically is provided. Operator controls permit variable magnification of image signals to a desired level. An optical sensor can be independently moved for focusing.

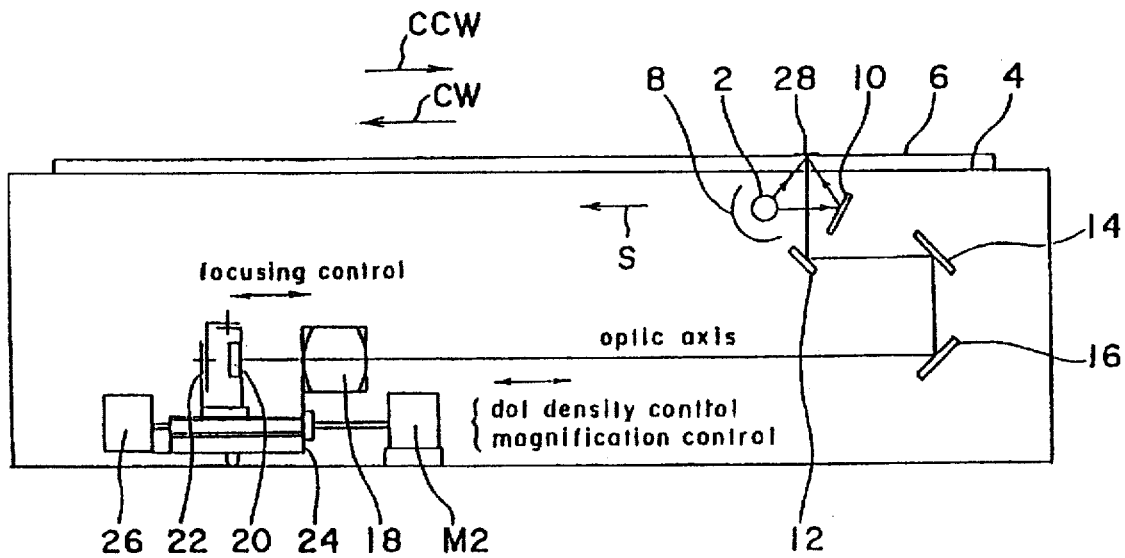

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 4 is confirmed.

Claim 1 is determined to be patentable as amended.

Claims 2 and 3, dependent on an amended claim, are determined to be patentable.

New claims 5-15 are added and determined to be patentable.

1. An apparatus for converting an optical image into electrical image signals with a magnification which is variable, comprising[;]:

an image sensor for transforming an optical image projected thereon into analog image signals;

a projection lens for projecting an optical image onto the image sensor;

optical magnification varying means for optically *and continuously* varying a size of the optical image to be projected on the image sensor through the projection lens *by moving the projection lens along a direction of an optic axis*;

converting means for converting the analog image signals received from the image sensor into digital image signals;

electrical magnification varying means for transforming the digital image signals received from the converting means into other digital image signals so as to vary the magnification; and generating means for giving a magnification varying instruction, wherein the magnification inside a predetermined range is varied by operating the optical magnification varying means in response to the magnification varying instruction while the magnification outside the predetermined range is varied by operating the electrical magnification varying means in response to the magnification varying instruction.

*5. An apparatus as claimed in claim 1, wherein the projection lens is moved by a stepping motor.*

*6. An apparatus as claimed in claim 1, wherein the electrical magnification varying means varies the magnification stepwise.*

*7. An apparatus as claimed in claim 1, wherein the image sensor comprises a charge-coupled device.*

*8. An apparatus as claimed in claim 1, wherein the electrical magnification varying means is operated while the magnification outside the predetermined range is larger than the predetermined range.*

*9. An apparatus as claimed in claim 1, wherein the electrical magnification varying means is operated while the magnification outside the predetermined range is smaller than the predetermined range.*

*10. An apparatus as claimed in claim 1, further comprising means for setting the projection lens to an initial position when a source of electric power is turned on.*

*11. An apparatus as claimed in claim 1, further comprising a position signal generator responsive to the projection lens, said generator generating a lens position signal when the projection lens is located at a selected position.*

*12. An apparatus as claimed in claim 1 wherein magnification lower than the minimum value of the predetermined range is varied by operating the electrical magnification varying means in response to the magnification varying instruction.*

*13. An apparatus as claimed in claim 1 wherein magnification larger than the maximum value of the predetermined range is varied by operating the electrical magnification varying means in response to the magnification varying instruction.*

*14. An apparatus as claimed in claim 1 wherein the magnification outside the predetermined range is varied by operating both the optical magnification varying means and the electrical magnification varying means in response to the magnification varying instruction.*

*15. An apparatus as claimed in claim 1 wherein the optical magnification varying means comprise a stepping motor coupled to the projection lens to move the projection lens along the direction of the optic axis.*

* * * * *